(12) United States Patent
Joaquin et al.

(10) Patent No.: US 12,412,431 B2
(45) Date of Patent: Sep. 9, 2025

(54) REAL TIME MONITORING MODULE FOR A VEHICLE

(71) Applicant: VOLKSWAGEN AKTIENGESELLSCHAFT, Wolfsburg (DE)

(72) Inventors: Fernandez-Garcia Joaquin, Essen (DE); Tao Li, Burgwedel (DE); Mihail Stoyanov, Aachen (DE); Tayfun Kilic, Bochum (DE); Jin Wu, Hattingen (DE); Arul Matheswaran, Herne (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 155 days.

(21) Appl. No.: 18/554,007

(22) PCT Filed: Mar. 22, 2022

(86) PCT No.: PCT/EP2022/057439
§ 371 (c)(1),
(2) Date: Oct. 5, 2023

(87) PCT Pub. No.: WO2022/214308
PCT Pub. Date: Oct. 13, 2022

(65) Prior Publication Data
US 2024/0185645 A1 Jun. 6, 2024

(30) Foreign Application Priority Data
Apr. 9, 2021 (DE) .................. 10 2021 108 938.7

(51) Int. Cl.
*G07C 5/00* (2006.01)
*H04L 67/12* (2022.01)

(52) U.S. Cl.
CPC .............. *G07C 5/008* (2013.01); *H04L 67/12* (2013.01)

(58) Field of Classification Search
CPC .................... G07C 5/008; H04L 67/12
(Continued)

(56) References Cited

U.S. PATENT DOCUMENTS

2012/0143977 A1  6/2012 Miche et al.
2013/0325323 A1* 12/2013 Breed ................ G01C 21/3667
                                                        701/420

(Continued)

FOREIGN PATENT DOCUMENTS

CN    103034235 A    4/2013
CN    106200518 A    12/2016
(Continued)

OTHER PUBLICATIONS

International Search Report and Written Opinion; International Patent Application No. PCT/EP2022/057439; Jul. 12, 2022.

*Primary Examiner* — Tyler D Paige
(74) *Attorney, Agent, or Firm* — BARNES & THORNBURG LLP

(57) ABSTRACT

A real time monitoring module for a transportation vehicle includes a data collector unit for receiving signals from a variety of vehicle devices including a control unit for processing the signals to provide different lists of signals, a first memory unit to store working data of the control unit, a second memory unit to store the different lists of signals, and a communication interface to forward the different lists of signals to a sending unit of the transportation vehicle wherein the sending unit provides a communication interface for the different lists of signals to various backend devices.

21 Claims, 1 Drawing Sheet

(58) Field of Classification Search
USPC .......................................................... 701/29.1
See application file for complete search history.

(56) References Cited

U.S. PATENT DOCUMENTS

| | | | |
|---|---|---|---|
| 2015/0178999 A1* | 6/2015 | Smith | H04W 4/60 |
| | | | 701/31.5 |
| 2016/0050269 A1 | 2/2016 | Botticelli | |
| 2016/0311423 A1 | 10/2016 | Storm | |
| 2017/0324817 A1* | 11/2017 | Oliveira | H04L 67/10 |
| 2019/0311404 A1* | 10/2019 | Wasserman | G08G 1/096716 |
| 2023/0038428 A1* | 2/2023 | O'Sullivan | H04W 12/02 |
| 2024/0185645 A1* | 6/2024 | Joaquin | G07C 5/008 |

FOREIGN PATENT DOCUMENTS

| | | |
|---|---|---|
| EP | 2634889 A1 | 9/2013 |
| FR | 3100649 A1 | 3/2021 |
| IN | 201941053823 A | 12/2019 |

* cited by examiner

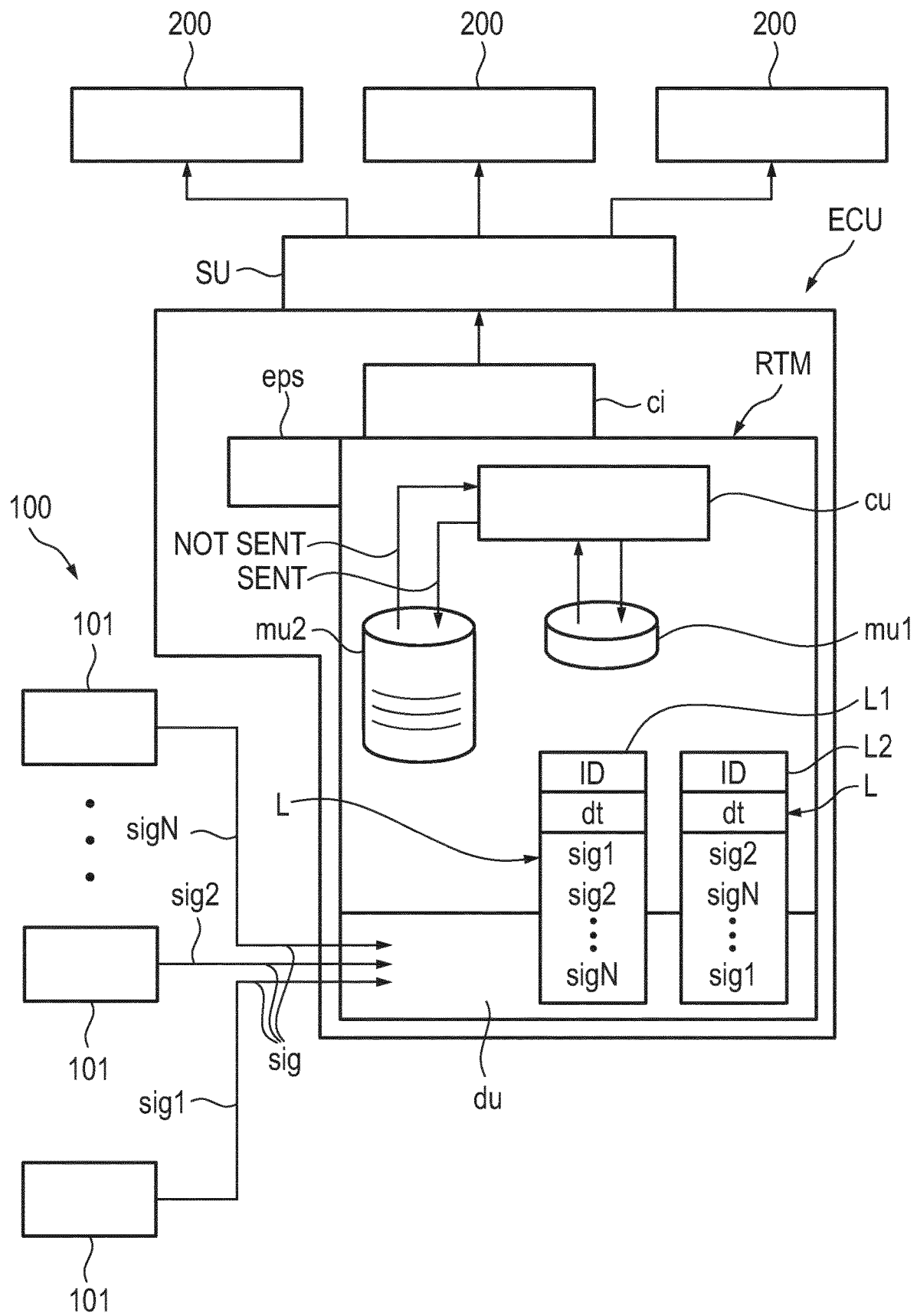

REAL TIME MONITORING MODULE FOR A VEHICLE

PRIORITY CLAIM

This patent application is a U.S. National Phase of International Patent Application No. PCT/EP2022/057439, filed 22 Mar. 2022, which claims priority to German Patent Application No. 10 2021 108 938.7, filed 9 Apr. 2021, the disclosures of which are incorporated herein by reference in their entireties.

SUMMARY

Illustrative embodiments relate to a real time monitoring module for a transportation vehicle, especially an electrical transportation vehicle. Further, the illustrative embodiments relate to an electronic control unit comprising a corresponding real time monitoring module. Furthermore, the illustrative embodiments relate to a transportation vehicle comprising a corresponding electronic control unit. Also, the illustrative embodiments are related to a method for providing real time monitoring services of a transportation vehicle, especially an electrical transportation vehicle, optionally by a corresponding real time monitoring module. Moreover, the illustrative embodiments relate to a computer program product for a corresponding method.

BRIEF DESCRIPTION OF THE DRAWINGS

Disclosed embodiments are explained in more detail below with reference to the drawing, in which:

FIG. 1 is a schematic design of a real time monitoring module.

DETAILED DESCRIPTION

Vehicle monitoring modules for collecting vehicle data, such as telematics data, are basically known, for example, from FR 3 100 649 A1, US 2016/050269 A1 or US 2012/143977 A1. Multiple vehicle devices in the transportation vehicle are able to provide such data. However, the treatment of vehicle data is sometimes not flexible on most modules, because the safety, the sensitivity and the selective consideration of the data are not considered.

Disclosed embodiments provide a real time monitoring module for a transportation vehicle, especially an electrical transportation vehicle. Disclosed embodiments also provide a real time monitoring module for a transportation vehicle, especially an electrical transportation vehicle, ensuring safe, sensitive, flexible and selected treatment of vehicle data. Also, disclosed embodiments provide a corresponding electronic control unit for the transportation vehicle, a corresponding transportation vehicle, a corresponding method and a related computer program product.

Disclosed embodiments provide a real time monitoring module for a transportation vehicle, an electronic control unit, a transportation vehicle comprising a corresponding electronic control unit, a method for providing real time monitoring services of a transportation vehicle, and a computer program product for a corresponding method. Details and features disclosed on individual embodiments also apply to the other embodiments and vice versa.

A first disclosed embodiment provides a real time monitoring module (optionally as an individually manageable and mountable assembly component with all hardware components and software components) for a transportation vehicle, especially an electrical transportation vehicle, comprising:
- a data collector unit (such as an interface module, for example, a CAN-bus or a LIN-bus, optionally, a vehicle bus) for receiving a plurality of signals (carrying vehicle data) from a variety of vehicle devices, comprising especially sensor devices, safety devices, environment devices, information devices, entertainment devices, comfort devices etc.,
- a (local and/or integrated) control unit for processing the plurality of signals to provide different lists of signals, especially for corresponding topics,
- a first memory unit (such as a volatile memory, especially a random-access memory) to store working data of the control unit,
- a second memory unit (such as a non-volatile memory) to store the different lists of signals (especially for providing a logging system, for example, a system log and/or a system protocol), and
- a communication interface (e.g., a wireless connection, such as Wi-Fi, or a wired connection, such as a CAN-bus or a LIN-Bus or an Ethernet connection) to forward the different lists of signals to an sending unit, such as an online connectivity unit, of the transportation vehicle configured to provide a communication interface for the different lists of signals to various backend devices, especially over internet.

The sending unit (such as the online connectivity unit) of the transportation vehicle may be configured to participate in a publish-subscribe messaging environment, such as Message Queuing Telemetry Transport (MQTT), which may use different topics, to which the various backend devices may subscribe. The sending unit may comprise a MQTT client to convert the different lists of signals to an appropriate format. The sending unit may forward the different lists of signals provided by the real time monitoring module to corresponding backend devices according to the different topics, to which the various backend devices are subscribed. The sending unit may further use the SOCKS protocol as an Internet protocol.

The idea is to sort the plurality of signals to provide different lists of signals. Thus, the signals may be individually treated, for example, according to a privacy category of a signal (how sensitive are vehicle data?), a current privacy settings of the transportation vehicle (which data are allowed to leave the transportation vehicle?), a required availability by a backend device (how often the backend device wishes to receive vehicle data), an authorization of a backend device (which vehicle data the backend device is allowed to receive?) and so on.

In such a way, vehicle data may be forwarded with more flexibility (individual lists), more safety (privacy settings on the transportation vehicle side and authorization on the backend side), more efficiency (only selected signals will be transmitted) and less waste to the network (not all signals will be transmitted at the same time and/or to each backend device).

Also, the user wishes may be treated with more flexibility. The user may, for example, choose privacy settings of the transportation vehicle among of different privacy levels (between a high privacy level/an offline modus and a full public level/online modus), wherein on different privacy levels only selected lists of signals may be allowed to leave the transportation vehicle.

Moreover, the requirements of the external devices may be treated with more flexibility. A situation is conceivable, when a backend device wishes to receive the vehicle position and the status of the vehicle battery. A corresponding list may be created by the control unit of the real time monitoring module containing two signals from a position sensor, for example, a Global Positioning System (GPS) sensor, of the transportation vehicle for providing the vehicle position and a battery sensor, such as a voltage sensor, SOC sensor or the like, of the battery monitoring device for providing the status of the vehicle battery. Optionally, the backend device may choose how often it wishes to receive the created list, for example, once a day, once an hour, once a minute, every 30 sec and so on.

Besides, improved mobile online services may be provided on the transportation vehicle, for example, in a publish-subscribe messaging environment using different topics provided by various backend devices. Exemplary embodiments may especially provide fast, reliable and highly responsive mobile online services for the vehicle devices. Queues may be reduced or even avoided. Also, the functionality of the electronic control unit and the transportation vehicle may be considerably improved in this way for more safety, intelligence, environmental and customer friendliness and comfortable operations as well as enjoyable operations.

In some exemplary embodiments, the data collector unit may be configured as an interface module to the variety of vehicle devices, especially as a CAN-bus or a LIN-bus, optionally as a vehicle bus. Thus, a data transmission between the variety of vehicle devices and the real time monitoring module may be enabled via a common transmission path. However, it is also possible that the variety of vehicle devices can be connected to the real time monitoring module by a wireless connection, such as a Wi-Fi, or an Ethernet connection, In some exemplary embodiments, the data collector unit may be communicatively coupled to the variety of vehicle devices, including at least one of the following sensors:
  a position sensor,
  a battery voltage sensor,
  a battery state sensor,
  a battery current sensor,
  a crash sensor,
  a speed sensor,
  a RPM sensor,
  an emission sensor,
  a noise sensor,
  a moisture sensor,
  an internal temperature sensor,
  an external temperature sensor,
  a fluid level sensor,
  a fuel sensor,
  a user biometric sensor,
  a user behavior sensor, etc.

Thus, a plurality of valuable telematics data for various purposes may be collected by the data collector unit.

Furthermore, the control unit is configured to arrange the plurality of signals among the different lists of signals according to:
  a privacy category of a signal of the plurality of signals,
  a privacy settings of the transportation vehicle,
  a required availability by a backend device of the various backend devices, and
  an identifier (that is authorization) of a backend device of the various backend devices.

With the help of the privacy settings, improved safety may be provided by transmission of vehicle data. Also, privacy settings may be considered on the transportation vehicle side to meet user wishes with more flexibility. An authorization may be provided on the backend side to allow only authorized backend devices to receive vehicle data. If the required availability is taken into account, more efficiency by transmission of vehicle data may be provided, because only selected signals will be transmitted as lists with necessary sending frequencies. Moreover, the waste to the network may be reduced, because not all signals will be transmitted at the same time and not all signals will be transmitted to each backend device.

In some exemplary embodiments, the control unit may be configured to provide a variable send mechanism for the different lists of signals. Optionally, the variable send mechanism may provide different sending frequencies for different lists. Optionally, the variable send mechanism may comprise different sending rules for sending the different lists of signals. The rules may define dependencies between privacy categories of signals, privacy settings of the transportation vehicle, sending frequencies and authorization levels of the backend devices. For example, the rules may define at which privacy level which lists are allowed to leave the transportation vehicle, to be received by which backend device and how often. If a list contains at least one signal allowed to leave the transportation vehicle, the whole list may be allowed to leave the transportation vehicle on this particular privacy level of the transportation vehicle as well.

In some exemplary embodiments, the control unit may be configured to provide a variable resend mechanism for the different lists of signals. Optionally, the variable resend mechanism may comprise different resending frequencies for different lists. For example, vital information, such as e-calls, may be resent more frequently than an information regarding entertainment services or the like. Furthermore, the variable resend mechanism may reduce the resending frequencies depending on the number of repetitions. Thus, network connection problems may be treated more efficiently. Optionally, the variable resend mechanism may comprise different resending rules for resending the different lists of signals. Thus, individual resending rules may be created which may serve for better mobile online services.

In some exemplary embodiments, the first memory unit may be configured as a volatile memory, especially a random-access memory. Thus, faster real time data processing may be provided.

In some exemplary embodiments, the second memory unit may be configured as a non-volatile memory, especially a magnetic computer storage device. Optionally, the second memory unit is configured to store:
  a first kind (SENT) of different lists of signals being successfully transmitted to corresponding backend devices of the various backend devices,
  a second kind (NOT SENT) of different lists of signals whose transmission to corresponding backend devices of the various backend devices failed,
  warnings from the variety of vehicle devices,
  events that occurred at the variety of vehicle devices.

In some exemplary embodiments, the second memory unit may comprise a logging system, especially a system log, optionally, a system protocol. Thus, the second memory unit may be helpful for inspections and error analysis.

In some exemplary embodiments, the second memory unit may be configured as a data recorder, especially a black box. Beside this, it is possible that the second memory unit may comprise a housing, especially a sealed housing, a fire protection, a fire sensor and an emergency antenna. Therefore, the second memory unit may be helpful for inspections and error analysis in case of accidents.

The real time monitoring module can be provided with an emergency power supply to ensure the functionality of the system, especially of emergency calls, even in case of lack of power supply and/or accidents.

A second disclosed embodiment provides an electronic control unit comprising a real time monitoring module as descried above and a sending unit for receiving the different lists of signals from the communication interface of the real time monitoring module and for forwarding the different lists of signals to the various backend devices. With exemplary embodiments of such an electronic control unit, the same benefits may be achieved as with the corresponding embodiments of the real time monitoring module described above. Full reference is made to these benefits in the present case. The electronic control unit may serve for controlling a plurality of vehicle devices in a transportation vehicle.

In some exemplary embodiments, the sending unit may be configured as an online or internet interface. Optionally, the sending unit may be configured to provide mobile online services for the transportation vehicle, particularly for a variety of vehicle devices, for example, in a publish-subscribe messaging environment, especially using different topics, which may correspond to the different lists of signals. That is, the different lists of signals may be configured to cover the topics of the publish-subscribe messaging environment. The mobile online services may provide safety, environment, information, entertainment and/or comfort services for the transportation vehicle.

A third disclosed embodiment provides a transportation vehicle comprising an electronic control unit configured as described above. With exemplary embodiments of such a transportation vehicle, the same benefits may be achieved as with the corresponding embodiments of the real time monitoring module described above. Full reference is made to these benefits in the present case.

A transportation vehicle may comprise a plurality of vehicle devices comprising at least one of the following devices:
  sensor device, such as position sensor, battery voltage sensor, crash-sensor, velocity sensor, and so on,
  safety device, for example, for breakdown calls, emergency calls,
  environment device, for example, for weather forecasts, pollutant load sensor, environmental zone detection unit,
  information device, for example, for online traffic information, online destination import, online route import, online POI search, my POIs, petrol stations, parking spaces, vehicle status report, time manager, weather, news and so on,
  entertainment device, for example, for streaming services, and/or
  comfort device, such as door closing detectors, light off detectors, parking position detectors, vehicle status and/or condition detector, trip database, user calendar, information call and so on.

Thus, services with improved functionality based on various cloud possibilities may be flexibly provided in the transportation vehicle.

Optionally, a transportation vehicle comprising a corresponding real time monitoring module may build a part of an improved vehicle-to-cloud-system.

A fourth disclosed embodiment provides a method for providing real time monitoring services of a transportation vehicle, especially an electrical transportation vehicle, optionally by a real time monitoring module described above, comprising:

receiving a plurality of signals from a variety of vehicle devices, comprising especially sensor devices, by a data collector unit,
processing the plurality of signals to provide different lists of signals by a control unit, and
forwarding the different lists of signals to an sending unit of the transportation vehicle by a communication interface, wherein the sending unit is configured to provide a communication interface (online or internet interface) for the different lists of signals to various backend devices.

Disclosed embodiments of the method may be carried out in the given order or in a modified order. Individual actions may be carried out simultaneously and/or repeatedly to allow a flowing process.

In some exemplary embodiments, the method may comprise at least one following:
  sending different lists by the sending unit, optionally with different sending frequencies, especially depending on:
    a privacy category of a signal of the plurality of signals,
    a privacy settings of the transportation vehicle,
    a required availability by a backend device of the various backend devices, and/or
    an identifier of a backend device of the various backend devices.

With exemplary embodiments of such a method, the same benefits may be achieved as with corresponding embodiments of the sending unit described above. Full reference is made to these benefits in the present case.

A fifth disclosed embodiment provides a computer program product comprising a program code for carrying out a method described above. In other words, the computer program product comprises instructions which, when the program is executed by a computer (especially by an electronic control unit, especially by a control unit of a real time monitoring module), cause the computer to carry out embodiments of the method described above. With exemplary embodiments of such a computer program product, the same benefits may be achieved as with the corresponding embodiments of the method described above. Full reference is made to these benefits in the present case.

FIG. 1 shows the first exemplary embodiment which is a real time monitoring module RTM for a transportation vehicle 100, especially an electrical transportation vehicle, comprising:
  a data collector unit du, (such as an interface module, for example, a CAN-bus or a LIN-bus, optionally, a vehicle bus), for receiving a plurality of signals sig (carrying vehicle data) from a variety of vehicle devices 101, comprising sensor devices, safety devices, environment devices, information devices, entertainment devices, comfort devices etc.,
  a (local and/or integrated) control unit cu for processing the plurality of signals sig to provide different lists L of signals sig, especially for corresponding topics,
  a first memory unit mu1 (such as a volatile memory, especially a random-access memory) to store working data of the control unit cu,
  a second memory unit mu2 (such as a non-volatile memory) to store the different lists L of signals sig (especially for providing a logging system, for example, a system log and/or a system protocol),
  and a communication interface ci (e.g., a wireless connection, such as Wi-Fi, or a wired connection, such as a CAN-bus or a LIN-Bus or an Ethernet connection) to forward the different lists L of signals sig to an sending unit SU of the transportation vehicle 100, wherein the sending unit SU is configured to provide a communication interface for the different lists L of signals sig to various backend devices 200, especially over internet.

The idea is to sort and arrange the plurality of signals sig to provide different lists L with selected signals sig. With the help of the disclosed embodiments, the signals sig may be individually treated, for example, according to a privacy category of a signal sig (how sensitive are vehicle data carried by the signal sig?), a current privacy settings of the transportation vehicle 100 (which data are allowed to leave the transportation vehicle, if any?), a required availability (or sending frequency) by a backend device 200 (how often the backend device 200 wishes to receive vehicle data), an authorization (according to the identifier ID) of a backend device 200 (which vehicle data the backend device 200 is allowed to receive?) and so on.

In such a way, vehicle data may be forwarded with more flexibility by individually configured lists L containing signals sig in an elected arrangement.

Further, vehicle data may be forwarded with more safety, wherein privacy settings on the transportation vehicle 100 side and authorization on the backend 200 side may be verified.

Optionally, the control unit cu may arrange the plurality of signals sig among the different lists L of signals sig according to:
- a privacy category of a signal sig of the plurality of signals sig,
- a privacy settings of the transportation vehicle 100,
- a required availability (that is sending frequency dt) by a backend device 200 of the various backend devices 200, and/or
- an identifier ID (that is authorization) of a backend device 200 of the various backend devices 200.

Furthermore, vehicle data may be forwarded with more efficiency, wherein only selected signals will be transmitted.

Beside this, less waste will be created in the network, wherein not all signals will be transmitted at the same time and/or to each backend device.

Also, the user wishes may be treated with more flexibility. The user may set the privacy settings of the transportation vehicle 100 to one of the different privacy levels, for example, between a high privacy level/an offline modus and a full public level/online modus, wherein on different privacy levels only selected lists L of signals sig may be allowed to leave the transportation vehicle and be received by selected backend devices.

Moreover, the requirements of the external devices 200 may be treated with more flexibility.

In an example, a particular backend device 200 may require to receive the transportation vehicle 100 position and the status of the transportation vehicle 100 battery. A corresponding list L may be created by the control unit cu containing two signals sig from a position sensor, such as a Global Positioning System GPS sensor, of the transportation vehicle 100 for providing the transportation vehicle 100 position and a battery sensor, such as a voltage sensor, for providing the status of the transportation vehicle 100 battery. Optionally, the backend device 200 may enquire how often it wishes to receive the created list L, for example, once a day, once an hour, once a minute, every 30 sec and so on. Such a service may be useful for a government purpose and/or for purposes of charging station providers.

Besides, with the help of the disclosed embodiments, fast, reliable and highly responsive mobile online services may be provided on the transportation vehicle 100, for example, in a publish-subscribe messaging environment using different topics provided by various backend devices 200 concerning safety, intelligence, environmental and customer friendliness and comfortable operations as well as enjoyable operations in the transportation vehicle 100.

The vehicle devices 101 may comprise following sensor devices:
- a position sensor,
- a battery voltage sensor,
- a battery state sensor,
- a battery current sensor,
- a crash sensor,
- a speed sensor,
- a RPM sensor,
- an emission sensor,
- a noise sensor,
- a moisture sensor,
- an internal temperature sensor,
- an external temperature sensor,
- a fluid level sensor,
- a fuel sensor,
- a user biometric sensor,
- a user behavior sensor, etc.

According to a facet of the real time monitoring module RTM, the control unit cu may provide a variable send mechanism for the different lists L of signals sig, wherein the variable send mechanism may provide different sending frequencies dt and/or different sending rules for different lists L. The rules may define dependencies between privacy categories of signals sig, privacy settings of the transportation vehicle 100, sending frequencies dt and authorization levels of the backend devices 200. For example, the sending rules may define at which privacy level which lists L are allowed to leave the transportation vehicle, to be received by which backend device and how often. If a list L contains at least one signal sig allowed to leave the transportation vehicle 100, the list L may be allowed to leave the transportation vehicle 100 as a whole.

According to a further facet of the real time monitoring module RTM, the control unit cu may provide a variable resend mechanism for the different lists L of signals sig, wherein the variable resend mechanism may comprise different resending frequencies and/or different resending rules for different lists L. For example, vital information, such as e-call, may be resent more frequently than an information regarding entertainment services or the like. Also, the variable resend mechanism may reduce the resending frequencies depending on the number of repetition, for example, by waiting for the connection to the network in case of interruptions.

The first memory unit mu1 may be configured as a volatile memory, especially a random-access memory RAM.

The second memory unit mu2 may be configured as a non-volatile memory, especially a magnetic computer storage device. Optionally, the second memory unit mu2 is configured to store:
- a first kind (sent) of different lists L of signals sig being successfully transmitted to corresponding backend devices 200 of the various backend devices 200,
- a second kind (not sent) of different lists L of signals sig whose transmission to corresponding backend devices 200 of the various backend devices 200 failed,
- warnings from the variety of vehicle devices 101,
- events that occurred at the variety of vehicle devices 101.

Thus, the second memory unit mu2 may serve as a logging system, especially a system log, optionally, a system protocol. This may be helpful for inspections and error analysis.

In other words, the second memory unit mu2 may be configured as a data recorder, especially a black box, wherein especially the second memory unit mu2 may comprise a sealed housing, optionally, a fire protection, using, for example, a fire sensor and an emergency antenna. Therefore, the second memory unit mu2 may be helpful for inspections and error analysis in case of accidents. The emergency antenna may serve for sending all signals to one main backend device in case of an accident.

As can be seen from FIG. 1, the real time monitoring module RTM can be provided with an emergency power supply eps to ensure the functionality of the module, especially sending an emergency call, even in case of a lack of power supply and/or accidents.

An electronic control unit ECU comprising a real time monitoring module RTM as described above and an sending unit SU for receiving the different lists L of signals sig from the communication interface ci of the real time monitoring module RTM and for forwarding the different lists L of signals sig to the various backend devices 200 represents a further exemplary embodiment.

The sending unit SU may be configured as an online or internet interface. Optionally, the sending unit SU may be configured to provide mobile online services for the transportation vehicle 100, particularly for a variety of vehicle devices 101, for example, safety, environment, information, entertainment and/or comfort services according to the different lists L of signals sig for corresponding services.

A transportation vehicle 100 comprising an electronic control unit ECU configured as described above represents another exemplary embodiment.

Such a transportation vehicle 100 may comprise a plurality of vehicle devices 101 comprising at least one of the following devices:
  sensor device, such as position sensor, battery voltage sensor, crash-sensor, velocity sensor, and so on,
  safety device, for example, for breakdown calls, emergency calls,
  environment device, for example, for weather forecast, pollutant load sensor, environmental zone detection unit,
  information device, for example, for online traffic information, online destination import, online route import, online POI search, my POIs, petrol stations, parking spaces, vehicle status report, time manager, weather, news and so on,
  entertainment device, for example, for streaming services, and/or
  comfort device, such as door closing detectors, light off detectors, parking position detectors, vehicle status and/or condition detector, trip database, user calendar, information call and so on.

Thus, the transportation vehicle 100 comprising a corresponding real time monitoring module RTM may build a part of an improved vehicle-to-cloud-system.

According to the fourth disclosed embodiment, a method for providing real time monitoring services of a transportation vehicle 100, especially an electrical transportation vehicle, optionally by a real time monitoring module RTM described above is provided, comprising:
  receiving a plurality of signals sig from a variety of vehicle devices 101, comprising especially sensor devices, by a data collector unit du,
  processing the plurality of signals sig to provide different lists L of signals sig by a control unit cu, and
  forwarding the different lists L of signals sig to an sending unit SU of the transportation vehicle 100 by a communication interface ci,
wherein the sending unit SU is configured to provide a communication interface, online or internet interface, for the different lists L of signals sig to various backend devices 200.

The method may further comprise:
  sending different lists L by the sending unit SU, optionally with different sending frequencies dt, especially depending on:
    a privacy category of a signal sig of the plurality of signals sig,
    a privacy settings of the transportation vehicle 100,
    a required availability by a backend device 200 of the various backend devices 200, and/or
    an identifier ID of a backend device 200 of the various backend devices 200.

A corresponding computer program product comprising a program code for carrying out a method described above represents a further exemplary embodiment. The computer program product comprises instructions which, when the program is executed by an electronic control unit, cause the electronic control unit to carry out embodiments of the method described above.

The above description of the FIGURES describes the present disclosure only in the context of examples. Of course, individual features of the exemplary embodiments may be combined with each other, provided it is technically reasonable, without leaving the scope of the disclosure.

REFERENCE SIGNS 100 transportation vehicle
101 vehicle device
200 backend device
ID identifier
dt sending frequency
RTM real time monitoring module
du data collector unit
cu control unit
mu1 first memory unit
mu2 second memory unit
ci communication interface
eps emergency power supply
sig signal
sig1 signal
sig2 signal
sigN signal
L list
L1 list
L2 list
SENT a first kind of different lists
NOT SENT a second kind of different lists
SU sending unit
ECU electronic control unit

The invention claimed is:

1. A module for improving data safety and network efficiency by providing differentiated transmission of signals including vehicle data generated by a plurality of vehicle devices on a transportation vehicle to a plurality of remote devices, the module comprising:
  a data collector unit configured to receive the plurality of signals from the plurality of vehicle devices including sensors, wherein the plurality of signals includes vehicle data detected by the sensors;

a module control unit configured to process the plurality of signals to provide a plurality of different lists of signals to sort the plurality of signals for individual treatment of signals based on a privacy category of a signal, current privacy settings of the transportation vehicle, a required availability of the signal for remote device monitoring, and remote device authorization for signal reception;

a first memory unit configured to store working data of the module control unit;

a second memory unit configured to store the plurality of different lists of signals; and a communication interface configured to forward the plurality of different lists of signals to a transmission unit of the transportation vehicle, wherein the transmission unit is configured to provide a communication interface for the plurality of different lists of signals to the plurality of remote devices, wherein the transmission unit communicates using Message Queuing Telemetry Transport (MQTT) protocol and the transmission unit includes a MQTT client that forwards the different lists of signals provided by the real time monitoring module to corresponding remote devices according to different topics to which the remote devices are subscribed using the SOCKS protocol, wherein the module control unit arranges the plurality of signals among the plurality of different lists of signals according to:

the privacy category of a signal of the plurality of signals, the privacy settings of the transportation vehicle, the required availability by a remote device of the plurality of remote devices, and an identifier of a remote device of the plurality of remote devices indicating authorization for the remote device to receive vehicle data, and wherein the module control unit is configured to control the transmission unit of the transportation vehicle to perform differentiated transmission of signals included in the different lists of the plurality of different lists of signals to the plurality of remote devices based on the arrangement of the plurality of signals among the plurality of different lists of signals performed by the module control unit.

2. The real time monitoring module of claim 1, wherein:
the data collector unit is an interface module that is configured to interface with the plurality of vehicle devices; and/or
the data collector unit is communicatively coupled to the plurality of vehicle devices, wherein the plurality of vehicle devices includes at least one of:
a position sensor,
a battery voltage sensor,
a battery state sensor,
a battery current sensor,
a crash sensor,
a speed sensor,
a RPM sensor,
an emission sensor,
a noise sensor,
a moisture sensor,
an internal temperature sensor,
an external temperature sensor,
a fluid level sensor,
a fuel sensor,
a user biometric sensor, and
a user behavior sensor.

3. The module of claim 1,
wherein the differentiated transmission of signals included in the different lists of the plurality of different lists of signals is controlled by the module control unit to provide a variable transmission mechanism for the plurality of different lists of signals,
wherein the variable transmission mechanism provides different transmission frequencies for different lists included in the plurality of different lists, and
wherein the variable transmission mechanism comprises different transmission rules for transmitting the different lists of signals included in the plurality of different lists.

4. The module of claim 1, wherein the module control unit is configured to provide a variable retransmission mechanism for the plurality of different lists of signals,
wherein the variable retransmission mechanism comprises different retransmitting frequencies for different lists included in the plurality of different lists based on the number of repetition, and
wherein the variable retransmission mechanism comprises different retransmission rules for retransmitting the different lists included in the plurality of different lists.

5. The module of claim 1, wherein the first memory unit is a volatile memory.

6. The module of claim 1, wherein the second memory unit is a non-volatile memory.

7. The module of claim 1, wherein the second memory unit stores:
a first category of different lists of signals being successfully transmitted to corresponding remote devices of the plurality of remote devices;
a second category of different lists of signals whose transmission to corresponding remote devices of the plurality of remote devices failed;
warnings generated by the plurality of vehicle devices; and
events that occurred at the plurality of vehicle devices.

8. The module of claim 1, wherein:
the second memory unit comprises a logging system, and/or
the second memory unit is a data recorder, and/or
the second memory unit comprises a housing, and/or
the module includes an emergency power supply for the module.

9. An electronic control unit comprising the module of claim 1 and the transmission unit for receiving the plurality of different lists of signals from the communication interface for forwarding the plurality of different lists of signals to the plurality of remote devices.

10. The electronic control unit of claim 9, wherein
the second memory unit comprises a logging system,
the transmission unit is an online or internet interface, and/or
the transmission unit provides mobile online services for the transportation vehicle.

11. A transportation vehicle comprising the electronic control unit of claim 9.

12. A method for improving data safety and network efficiency by providing differentiated transmission of signals including vehicle data generated by a plurality of vehicle devices on a transportation vehicle to a plurality of remote devices, the method comprising:

receiving, by a data collector unit, a plurality of signals from the plurality of vehicle devices including sensors, wherein the plurality of signals includes vehicle data detected by the sensors;

processing, by a module control unit, the plurality of signals to provide a plurality of different lists of signals to sort the plurality of signals for individual treatment of signals based on a privacy category of a signal, current privacy settings of the transportation vehicle, a required availability of the signal for remote device monitoring, and remote device authorization for signal reception;

forwarding, by a communication interface, the plurality of different lists of signals to a transmission unit of the transportation vehicle, wherein the transmission unit provides a communication interface for transmitting the plurality of different lists of signals to the plurality of remote devices, wherein the transmission unit communicates using Message Queuing Telemetry Transport (MQTT) protocol and the transmission unit includes a MQTT client that forwards the different lists of signals provided by the real time monitoring module to corresponding remote devices according to different topics to which the remote devices are subscribed using the SOCKS protocol, wherein the module control unit arranges the plurality of signals among the plurality of different lists of signals according to:

the privacy category of a signal of the plurality of signals, the privacy settings of the transportation vehicle, the required availability by a remote device of the plurality of remote devices, and wherein the module control unit is configured to control the transmission unit of the transportation vehicle to perform differentiated transmission of signals included in the different lists of the plurality of different lists of signals to the plurality of remote devices based on the arrangement of the plurality of signals among the plurality of different lists of signals performed by the module control unit.

13. The method of claim 12, further comprising:

transmitting the plurality of different lists by the transmission unit based on:

the privacy category of a signal of the plurality of signals, the privacy settings of the transportation vehicle, the required availability by a remote device of the plurality of remote devices, and/or the identifier of a remote device of the plurality of remote devices.

14. A non-transitory computer program product comprising code, wherein when the code is executed by a computer, the computer performs the method of claim 12.

15. The method of claim 12, wherein the data collector unit is an interface module that is configured to interface with the plurality of vehicle devices and/or the data collector unit is communicatively coupled to the plurality of vehicle devices, including at least one of:

a position sensor, a battery voltage sensor, a battery state sensor, a battery current sensor, a crash sensor, a speed sensor, a RPM sensor, an emission sensor, a noise sensor, a moisture sensor, an internal temperature sensor, an external temperature sensor, a fluid level sensor, a fuel sensor, a user biometric sensor, and a user behavior sensor.

16. The method of claim 15, wherein the differentiated transmission of signals included in the different lists of the plurality of different lists of signals is controlled by the module control unit to provide a variable transmission mechanism for the plurality of different lists of signals, wherein the variable transmission mechanism provides different transmission frequencies for the different lists included in the plurality of different lists, and wherein the variable transmission mechanism comprises different sending rules for transmitting the different lists included in the plurality of different lists of signals.

17. The method of claim 15, wherein the module control unit is configured to provide a variable retransmission mechanism for the different lists included in the plurality of different lists of signals, wherein the variable retransmission mechanism comprises different retransmission frequencies for different lists included in the plurality of different lists based on the number of repetition, and wherein the variable retransmission mechanism comprises different retransmission rules for retransmitting the different lists included in the plurality of different lists of signals.

18. The method of claim 12, wherein the first memory unit is a volatile memory.

19. The method of claim 12, wherein the second memory unit is a non-volatile memory.

20. The method of claim 12, wherein the second memory unit stores:

a first category of different lists of signals being successfully transmitted to corresponding remote devices of the plurality of remote devices;

a second category of different lists of signals whose transmission to corresponding remote devices of the plurality of remote devices failed;

warnings from the plurality of vehicle devices; and events that occurred at the plurality of vehicle devices.

21. The method of claim 12, wherein:

the second memory unit comprises a logging system, and/or the second memory unit is a data recorder, and/or the second memory unit comprises a housing, and/or module includes an emergency power supply for powering the method.

* * * * *